(12) United States Patent
Plochmann et al.

(10) Patent No.: US 12,413,123 B2
(45) Date of Patent: Sep. 9, 2025

(54) APPARATUS AND METHOD FOR INSULATION OF A BODY CARRYING SINGLE-LAYER OR MULTI-LAYER WINDINGS, AND ELECTRIC MACHINE

(71) Applicant: Siemens Aktiengesellschaft, Munich (DE)

(72) Inventors: Bastian Plochmann, Neustadt an der Aisch (DE); Tobias Katzenberger, Bad Königshofen STT Untereßfeld (DE)

(73) Assignee: INNOMOTICS GMBH, Nuremberg (DE)

( * ) Notice: Subject to any disclaimer, the term of this patent is extended or adjusted under 35 U.S.C. 154(b) by 143 days.

(21) Appl. No.: 18/042,250

(22) PCT Filed: Aug. 9, 2021

(86) PCT No.: PCT/EP2021/072183
§ 371 (c)(1),
(2) Date: Feb. 20, 2023

(87) PCT Pub. No.: WO2022/037988
PCT Pub. Date: Feb. 24, 2022

(65) Prior Publication Data
US 2024/0014720 A1   Jan. 11, 2024

(30) Foreign Application Priority Data
Aug. 18, 2020   (EP) .................................... 20191514

(51) Int. Cl.
  H02K 15/12    (2025.01)
(52) U.S. Cl.
  CPC .................... H02K 15/12 (2013.01)

(58) Field of Classification Search
  CPC ......... H02K 15/12; H02K 15/122; H02K 3/30
  See application file for complete search history.

(56) References Cited

U.S. PATENT DOCUMENTS

| 2009/0322188 A1* | 12/2009 | Yamazaki | ............... H02K 13/10 |
| | | | 310/40 MM |
| 2016/0036282 A1* | 2/2016 | Nakayama | ............... H02K 15/12 |
| | | | 205/122 |

FOREIGN PATENT DOCUMENTS

| FR | 2 210 042 | 7/1974 | ............. H02K 15/12 |
| JP | S57 132750 | 8/1982 | ............. H02K 15/12 |
| JP | S63 107441 | 5/1988 | ............. H02K 15/12 |

OTHER PUBLICATIONS

FR2210042A1—Machine Translation (Year: 1974).*
(Continued)

*Primary Examiner* — Yunju Kim
(74) *Attorney, Agent, or Firm* — Slayden Grubert Beard PLLC

(57) ABSTRACT

Various teachings of the present disclosure include a device for impregnating, consolidating, or electrically insulating a body bearing single-layer or multi-layer windings. In some embodiments, the device comprises: electrical contacts for applying a DC voltage between the windings and the body; a multi-component reactive resin; and a resin bath filled with the reactive resin. A DC voltage of at least 300 V/mm is applied between the windings and the body, with the result that the body bearing the windings, on the one hand, and the windings, on the other hand, act like the two electrodes of a capacitor and draw in the reactive resin.

10 Claims, 2 Drawing Sheets

(56) References Cited

OTHER PUBLICATIONS

Search Report for International Application No. PCT/EP2021/072183, 12 pages, Oct. 20, 2021.
Search Report for EP Application No. 20191514.7, 9 pages, Feb. 2, 2021.

* cited by examiner

APPARATUS AND METHOD FOR INSULATION OF A BODY CARRYING SINGLE-LAYER OR MULTI-LAYER WINDINGS, AND ELECTRIC MACHINE

CROSS-REFERENCE TO RELATED APPLICATIONS

This application is a U.S. National Stage Application of International Application No. PCT/EP2021/072183 filed Aug. 9, 2021, which designates the United States of America, and claims priority to EP Application No. 20191514.7 filed Aug. 18, 2020, the contents of which are hereby incorporated by reference in their entirety.

TECHNICAL FIELD

The present disclosure relates to electric machines. Various embodiments of the teachings herein include device and/or methods for insulating an electric machine body bearing single-layer or multi-layer windings and electric machines having such insulation.

BACKGROUND

Electric machines, such as electric motors, are produced by means of round enameled wires that are wound and are drawn into the stator laminated core after the winding process. The enameled wire corresponds to the main insulation in the field of application of low-voltage motors, for example up to 1 kV. However, usually further impregnation, or potting, is carried out for the purpose of further mechanical consolidation and passivation against external influences.

Electric machines, for example motors, are usually produced in multiple manufacturing steps. A stator is subjected to an impregnating method, which is conventionally realized using a hot-curing impregnating resin, for example after windings have been drawn in and phase separators, slot insulation and slot closures have been introduced.

In particular in the field of smaller motors, use is frequently made of an impregnating method in the course of which the motor is drawn though a bath comprising resin, also referred to as resin bath. In this respect, smaller motors are, for example, motors having an axis height 63 up to an axis height 160, with the axis height being the dimension in mm from the motor stand base to the center of an axis of rotation.

From a manufacturing technology perspective, the impregnation is often a bottleneck, since, as a result of the process, it is a complex operation in which liquid reactive resin, for example epoxy resin and/or polyester resin, is introduced into the stator laminated core. This is done, for example, by dipping, dip rolling and/or trickling.

In this respect, generally the greatest challenge is to select an impregnating agent which satisfies the insulation requirements but also which, within as short as possible a dwell time, on the one hand flows into the cracks and folds of the winding as highly fluid impregnating agent in a gas-free manner and without the formation of pores, and on the other hand is retained in the winding there, that is to say ideally does not flow out of the winding again very much, if at all, during the transfer to the next process step—for example when the stator laminated core is being retrieved from the resin bath.

According to the prior art, to that end an accelerator, or catalyst, which initiates the polymerization of the impregnating agent is selected such that the impregnating agent is present still in a highly fluid state—that is to say low-viscosity state—first of all, flows into all the cracks of the winding, but then polymerizes quickly under the impregnation conditions and gelates at least on the surface to the extent that the impregnating agent remains suspended in the winding, in particular even counter to gravitational force, when the stator laminated core is being retrieved from the resin bath.

Indeed, EP 20159310 discloses a method for impregnating, consolidating or electrically insulating a body bearing single-layer or multi-layer windings, in particular a body for an electric machine, wherein the body bearing the windings is dipped into a multi-component resin system or has the multi-component resin system trickled over it or is sprayed with the multi-component resin system, wherein, in particular in the case of the rolling operation and/or spraying operation and/or trickling operation, the use of a 2K—a two-component—resin system is preferred. This method makes it possible to impregnate and subsequently gelate the resin at almost room temperature or a temperature slightly higher than room temperature—for example at 60° C.

In this respect, the rotation of the body may prevent the resin system from dripping off. As a result of capillary forces that are present, the resin is drawn into the slots and gelates there within a few minutes. There should be no dripping after at most 20 min. The body can be removed from the rolling station and subjected to further processing without needing to be cured and/or cooled down for a long period of time.

However, a disadvantage of this system is that the method makes use of low temperatures, and therefore the reactive resin, that is to say the resin in the case of which the two components are already mixed, has a relatively high viscosity and accordingly the flow behavior, in particular in the horizontal direction, into the slots, which can be some 100s of mm long, is inhibited by capillary forces.

The capillary forces, which are smaller compared to other methods with higher temperatures, cause there to be longer process times, that is to say a longer period of time until a defined amount of reactive resin is applied to the stator laminated core with the winding, with the result that the mass is drawn into the rolling stator laminated core by capillary forces without dripping.

SUMMARY

The teachings of the present disclosure include devices and/or methods which make it possible to optimize this process time. For example, some embodiments of the teachings herein include a device for impregnating, consolidating, or electrically insulating a body bearing single-layer or multi-layer windings, wherein the device comprises electrical contacts for applying a DC voltage between the windings and the body, a multi-component reactive resin and a resin bath filled with the reactive resin, wherein a DC voltage of at least 300 V/mm is applied between the windings and the body, with the result that the body bearing the windings, on the one hand, and the windings, on the other hand, act like the two electrodes of a capacitor and draw in the reactive resin.

In some embodiments, at least one electrical contact is a clamp.

In some embodiments, at least one electrical contact is a sliding contact.

In some embodiments, the sliding contact is a carbon brush.

As another example, some embodiments include a method for impregnating an electric machine body bearing single-layer or multi-layer windings, wherein the body bearing windings is dipped into a reactive resin bath into a multi-component reactive resin or has the multi-component reactive resin trickled over it or is sprayed with the multi-component reactive resin, wherein, during the impregnating operation, a DC voltage is applied between the windings and the body bearing the windings in such a way that there is at least 300 V/mm between them.

In some embodiments, a DC voltage of at least 500 V/mm is applied.

In some embodiments, a DC voltage of at least 700 V/mm is applied.

In some embodiments, a DC voltage of at least 1000 V/mm is applied.

In some embodiments, a DC voltage of at least 2000 V/mm is applied.

In some embodiments, a DC voltage in the range of 2100 V/mm to 4000 V/mm is applied.

As another example, some embodiments include an electric machine impregnated by one or more of the methods described herein.

In some embodiments, the electric machine is a motor.

In some embodiments, the electric machine is a generator.

In some embodiments, the electric machine is a transformer.

BRIEF DESCRIPTION OF THE DRAWINGS

The teachings herein are explained in more detail below on the basis of 3 figures.

DETAILED DESCRIPTION

Some embodiments of the teachings herein include a device for impregnating, consolidating or electrically insulating a body bearing single-layer or multi-layer windings, wherein a DC voltage is applied between the winding and the body, with the result that the body bearing the windings, on the one hand, and the windings, on the other hand, act like the two electrodes of a capacitor and draw in a liquid dielectric.

Some embodiments include a method for impregnating an electric machine body bearing single-layer or multi-layer windings, wherein the body bearing windings is dipped into a multi-component reactive resin bath or has the multi-component reactive resin trickled over it or is sprayed with the multi-component reactive resin, wherein, during the impregnating operation, a DC voltage is applied between the windings and the body bearing the windings in such a way that there is at least 300 V/mm, 500 V/mm, or between 500 V/mm and 4000 V/mm between them.

Liquid and uncrosslinked reactive resins are electrically insulating liquids that generally have an electrical dipole nature, although this depends on the molecular chain length and composition. It is known that electrically insulating liquids are sucked into an electrical field by capillary forces. As reconstructed in the experiment—see FIG. 1—using a simple plate capacitor, a considerably higher liquid level is produced between the plates than outside of the electrical field generated by the plates.

Figure 1:
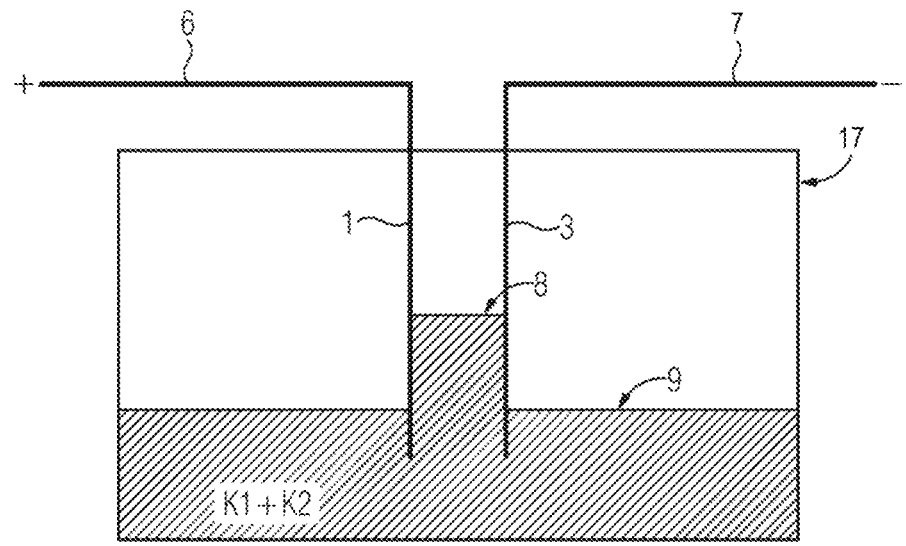
FIG. 1 shows the principle of the generation of electrostatic capillary forces in a reactive resin bath.

FIG. 1 schematically reproduces the corresponding experiment and shows this very simple structure of a capacitor in a trough with a reactive resin "K1+K2" in the form of liquid dielectric. The teachings of the present disclosure include using, for example, of the resin bath instead of the trough and the winding, on the one hand, and the body bearing the winding, on the other hand, instead of the two plates. These are connected with opposite polarity when contact is made with the liquid reactive resin. This is shown—as a cross-sectional view in a slot filled with a winding—in FIG. 2. Here, the result is the desired effect of the development of electrostatic capillary forces, which suck the reactive resin into the inaccessible cavities and/or cracks, in order that the windings in the slots are impregnated as completely as possible.

As reactive resin, it is possible to use all types of fully mixed impregnating agents that in the liquid state have a higher dielectric constant than air. Liquid uncrosslinked reactive resins are electrically insulating liquids and, depending on the molecular chain length and composition, have an electrical dipole nature. From manufacturing-related measurements, it is known that, for example, unsaturated polyester resins have a dielectric constant of approximately 6 to 10 at 50 Hz. Therefore, it is a liquid dielectric.

An effect of liquid, that is to say fluid, dielectrics and capacitive structures is a flow force in the liquid that attempts to suck the liquid dielectric into a capacitor as soon as it is provided with a charge and the capacitor interspace is filled with a dielectric having a low dielectric constant, for example with air, which has a dielectric constant=1.

Some embodiments include using the dielectric force to promote and accelerate the flow of the liquid resin into the stator. Accordingly, an electrostatic field is generated between the winding, the slot liner and the laminated core, or, if appropriate, also between various windings, resulting in the capacitor effect. For example, in the case of rolling impregnation, by means of sliding contact, a voltage, that is to say a high potential in relation to ground, is applied to the rolling stator laminated core. In this respect, the drawn-in windings, which are electrically insulated from the laminated core in the first instance by enameled wire and in the second instance by the slot liners, serve as open ground with what is referred to as floating potential. This makes it possible to realize a capacitive structure between the winding and the stator laminated core in such a way that a respective radial electrical field is generated from the filled slot toward the stator laminated core, that is to say in particular such that the flow region of the liquid reactive resin is enclosed. The electrical field generated brings about an electrostatic capillary force, which draws the liquid reactive resin into the slot regions, which are otherwise filled with air.

In this disclosure, "body bearing multi-layer windings" refers in particular to a stator laminated core. A body of this type generally is made of electrically conductive material, for example sheet metal, iron, etc. In some embodiments, the body has slots into which the wires, having primary insulation, as winding are drawn. This winding is then electrically insulated in the slot—for example within what are referred to as slot liners made of a surface insulating substance, for example folded paper, etc.—by completely potting it with impregnating agent. This second insulation is also referred to as secondary insulation.

The quality of the secondary insulation decisively depends on the complete filling of the slots, that are filled with winding, with impregnating agent. Air pockets and/or pores are particularly damaging here and the teachings herein may help avoid air pockets in the secondary insulation as completely as possible. Therefore, for example, the slot and winding are connected with opposite polarity before they are dipped into a resin bath.

Figure 3:
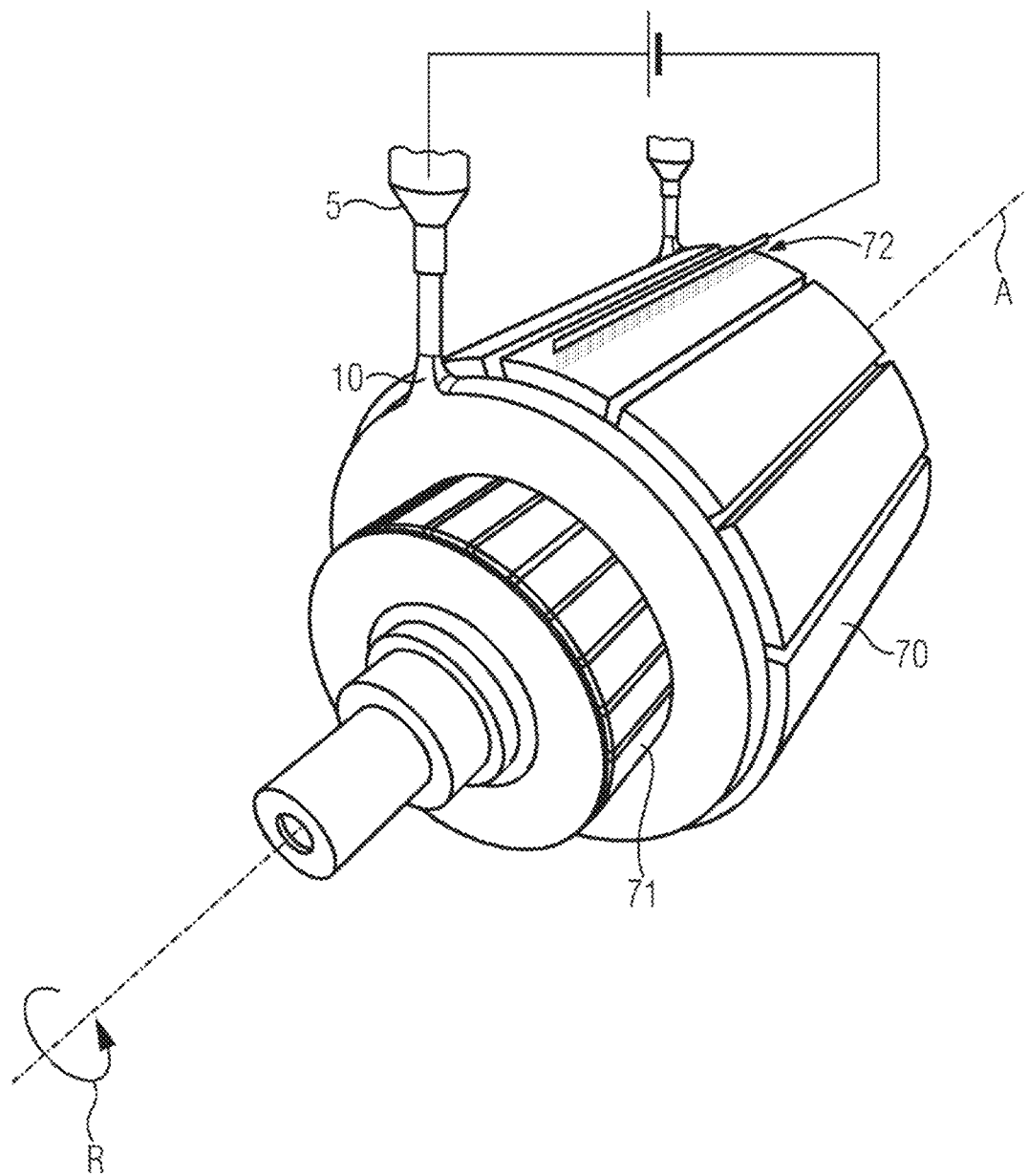
FIG. 3 shows an example system in which the principle shown in FIG. 1 is applied to a rolling stator.

In the case of a rotating or rolling installation, simple connection is not possible, and therefore it is proposed here for contact to be made with the stator laminated core for example by means of a carbon brush—see FIG. 3—which extends over the entire stator laminated core, since the laminations are insulated from one another.

"Winding" refers to conductors in the form of wires, which, for example, are drawn into the slots of a stator laminated core in the form of what are referred to as "random windings" and/or in ordered fashion as individual wires or in bundles, each provided with primary insulation. The winding comprises wires, such as copper wires, in a form already having primary insulation with respect to one another, with an enameled wire constituting routine primary insulation, for example.

In some embodiments, the body bearing the windings is dipped into the multi-component resin system or has the multi-component resin system trickled over it or is sprayed with the multi-component resin system at room temperature. In some embodiments, the body is a motor or generator or a transformer. The motor/generator may have a rotor and a stator. The body may also be a stator or a rotor.

In some embodiments, the body bearing the windings is dipped into the multi-component resin system or has the multi-component resin system trickled over it or is sprayed with the multi-component resin system at an ambient temperature of 15° C. to 25° C., in particular 20° C. to 23° C.

In some embodiments, the body bearing the windings is preheated to a temperature of 30° C. to 80° C., in particular 30° C. to 60° C. Preferably, the body bearing the windings is inductively preheated to a temperature of 30° C. to 80° C., in particular 30° C. to 60° C. Different ambient temperatures, for example in summer or winter, do not affect the impregnating operation, consolidating operation or electrical insulation operation.

The body bearing the windings has a defined temperature at the start of the impregnating method depending on the ambient temperature, and then cools down.

In some embodiments, the multi-component resin system comprises at least two components, with a first component being a resin and a second component being a curing agent. A first example: The first component, in particular a resin, has a viscosity of 2000 to 2500 mPa·s at an ambient temperature of 25° C. and a density of 1.13 to 1.17 g/ml at an ambient temperature of 20° C. The second component, in particular a curing agent, has a viscosity of 40 to 60 mPa·s, in particular 50 mPa·s, at an ambient temperature of 25° C. and a density of 0.98 to 1.00 g/ml at an ambient temperature of 20° C. A mixing ratio in parts by weight is 100 parts resin to 20 parts curing agent. A mixing ratio in parts by volume is 100 parts resin to 23 parts curing agent. A pot life at room temperature for 100 g of the mixed material is between 20 and 40 min, preferably 30 min.

A second example: The first component, in particular a resin, has a viscosity of 2400 to 2600 mPa·s, 2500 mPa·s, at an ambient temperature of 25° C. and a relative density of 1.13 to 1.17 g/cm³, in particular 1.15 g/cm³. The second component, in particular a curing agent, has a viscosity of 200 to 200 mPa·s, 300 mPa·s, at an ambient temperature of 25° C. and a relative density of 1.00 to 1.04 g/cm³, in particular 1.02 g/cm³. A mixing ratio in parts by weight is 5 parts resin to 1 part curing agent. A mixing ratio in parts by volume is 4.3 parts resin to 1 part curing agent. The mixed material has a viscosity of 1550 to 1750 mPa·s, 1650 mPa·s, at an ambient temperature of 25° C. and a relative density of 1.11 to 1.15 g/cm³, in particular 1.13 g/cm³. A gelating time at 25° C. is between 25 and 45 min, preferably 35 min.

In some embodiments, the multi-component resin system is highly reactive. In some embodiments, the multi-component resin system is a two-component resin system, if appropriate with further routine additives. In some embodiments, the second component has a viscosity of 40 to 300 mPa·s at an ambient temperature of 25° C.

In some embodiments, the resin is an epoxy resin or silicone resin, the curing agent being an amine-based curing agent. The amine-based curing agent allows the curing to take place at room temperature, also referred to as cold curing. For example, epoxy resin has excellent mechanical properties and results in only a small change in volume during the curing. Epoxy resin does not contain any solvent and has a VOC content <1% (volatile organic compounds, VOC for short), i.e. less than 1% by weight of the entire material evaporates in the course of the curing operation.

In some embodiments, the body rotates about an axis when the body is dipped into a multi-component resin system or has the multi-component resin system trickled over it or is sprayed with the multi-component resin system. In some embodiments, the body is located on a rolling station—see FIG. 3.

In some embodiments, the first component and the second component are delivered separate from one another, with the first component and the second component being blended to form the multi-component resin system immediately before the dipping operation or before the trickling operation or before the spraying operation. Blending the two resin components K1 and K2 produces the reactive resin. "Immediately" means at most 10 min.

The rotation of the body prevents the resin system, in particular the resin, from dripping off. As a result of capillary forces that are present, the resin is drawn into the winding, or the slots, and gelates there within a few minutes. There should be no dripping after at most 20 min. The body can be removed from the rolling station and subjected to further processing—without needing to be cured and/or cooled down for a long period of time.

In some embodiments, the multi-component resin system has a viscosity of 300 mPa·s at 25° C. This viscosity describes an initial viscosity at 25° C. Since the body was heated to 30° C. to 80° C., in particular 30° C. to 60° C., the actual viscosity is lower.

In some embodiments, the multi-component resin system has a viscosity of 15 000 mPa·s after a period of 20 to 30 min after striking the body.

In some embodiments, the multi-component resin system for a trickling operation is formed as a jet with a metering rate between ml/s and 2 ml/s.

The stated metering rate is advantageous, since it enables optimum delivery of the resin system. The stated metering rate is additionally advantageous since it causes the resin system to be drawn into the winding via capillary forces. According to the invention, a voltage of opposite polarity is applied to the stator laminated core, on the one hand, and to the winding, on the other hand, via a DC voltage, as a result of which the capillary forces, which are already prevailing in any case, are assisted by electrostatic capillary forces, in order that the slot is filled with impregnating agent as completely as possible during the impregnating method.

In some embodiments, the multi-component resin system is at least 95%, or at least 97%, cured after less than 100 h, or less than 72 h, at an ambient temperature of 15° C. to 25° C., in particular 20° C. to 23° C. In some embodiments, the multi-component resin system cures without the active introduction of heat. In some embodiments, at room temperature, the multi-component resin system is at least 97% cured after 24 h.

FIG. 1 is a schematic drawing which shows the principle of the generation of electrostatic capillary forces in a liquid two-component resin mixture. FIG. 1 shows a resin bath 17, which is filled to the liquid level 8, or 9, with the reactive resin "K1+K2". Two capacitor plates 1 and 3, which are electrically connected with opposite polarity via the two connections 6 and 7, are dipped in the resin bath 17. This results in the formation of a capacitor between the two plates 1 and 3 that sucks the reactive resin "K1+K2", which is a liquid dielectric, up between the plates to the liquid level 8 counter to gravitational force, owing to electrostatic capillary forces. The rest of the resin bath 17 is filled only to a lower level, to the liquid level 9.

As shown, when the voltage is being applied, the reactive resin K1+K2 is sucked between the capacitor plates 1 and 3 counter to the gravitational force acting on it, with the result that the capacitor can physically maximize its inherent stored energy. The height 8 to which the reactive resin K1+K2 rises results from the force imbalance of the dielectric force, which is larger than the gravitational force acting on the liquid with a density of approximately 1 g/cm$^3$, for example.

Figure 2:
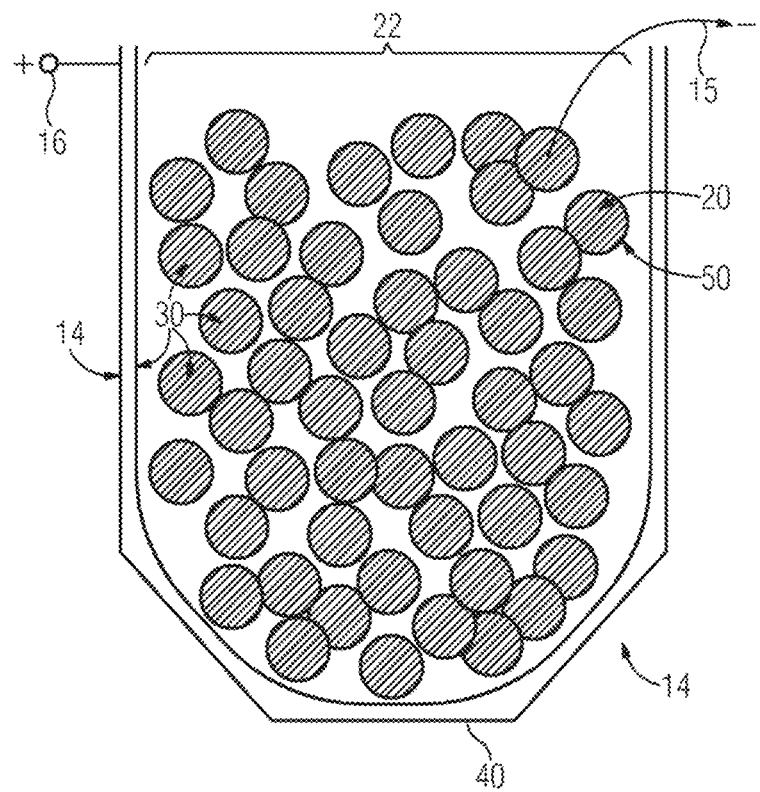
FIG. 2 shows an example system in which the principle shown in FIG. 1 is applied to a slot filled with a winding.

FIG. 2 shows an example system in which this principle is realized by simple clamping connections 16 and 15 during the impregnating method. Here, in the form of a cross section, what can be seen is a filled slot 40 in the stator laminated core 14 and a detail of a stator laminated core 14 corresponding to the outermost shell 14, which is connected to a positive pole (+) via, for example, a clamp 16. Within this stator laminated core 14 there is the slot liner 30, which is filled with a winding and is connected to a negative pole (−) via a further clamp 15. Instead of the capacitor plates, here a potential of opposite polarity is applied to the stator laminated core 14, on the one hand, and the filled slot liner 30, on the other hand, via the connections 16 and 15. What is therefore produced between the filled slot liner 30 and the laminated core 14 is a capacitor structure, which, in addition to the normally acting capillary forces of a winding 22, develops another electrostatic capillary force for sucking in the reactive resin between the filled slot liner 30 and the stator laminated core 14, when the stator laminated core 14 connected via the clamps 16, 15 is dipped as a whole into a resin bath 17.

The connections 16 and 15 can here be realized by clamps, but also by any desired other electrical contacts. Also visible in FIG. 2 are the round cross sections of the conductor 20 of a winding 22 that is in the slot liner 30 and comprises copper wires 20, which are surrounded by primary insulation 50. The desired capacitor structure forms here between the conductors of the winding, which are connected via 15—illustrated in the figure in a simplified manner via the slot liner 30—, on the one hand, and the laminated core 14, which is connected via 16, on the other hand.

In some embodiments, a DC voltage is applied via the electrical contacts 15, 16, with the result that the field intensity in the region of the slot base 30, that is to say, for example, from the copper winding 22 to the iron of the stator laminated core 14, is, for example, 1000 V/mm or more. The distance between the copper 20 and the iron/lamination 14 of the stator laminated core 14 is provided by the slot liner 30 and an air gap. For example, the distance amounts to 200 µm to 700 µm, in particular 300 µm to 500 µm and, in the case of larger machines, up to 1 mm. Then, in any case, a minimum voltage of 300 V, in particular 500 V, may be necessary to generate a sufficient electrostatic capillary force that sucks the reactive resin into the cracks and air gaps during the impregnation.

The required voltage level can vary; for example, it also depends on the flow behavior of the reactive resin in the resin bath 17 (not shown in FIG. 2 for the sake of simplicity), in particular on its individual viscosity, which in turn depends on the two components K1 and K2, on the temperature and/or the degree of crosslinking. For example, use is made of voltages of 1 to 3 kV/ram up to 4 kV/ram. Upper limits are placed on the voltage—for example owing to the occurrence of partial discharges.

FIG. 3 shows a dynamoelectric rotary machine 12 during the impregnating method. This figure shows a further example system by way of which it is also possible to realize a capacitor structure where simple electrical contact between the wires of the winding within the slot liner by means of clamps is not possible. In this embodiment, which is also known from application EP 20159310, which is not yet published, a sliding contact 72 is realized, for example.

FIG. 3 shows a stator 70 and a rotor 71. Instead of a resin bath, the multi-component reactive resin 10, comprising for example K1 and K2, strikes the stator 70 through the nozzle 5, while the stator 70 rotates about the axis A in the direction of rotation R.

FIG. 3 indicates carbon brushes as sliding contact 72. They may reach over the entire laminated core, since the laminations are insulated from one another. The brushes 72 make contact with the stator laminated core 70 during the rotation and impregnation. The copper winding per se then serves as opposite pole.

The electrical field generated in this way brings about a force that draws the liquid reactive resin into the slot regions, which are otherwise filled with air. This force acts in addition to the capillary forces acting here during the rolling impregnating operation, the two forces combining to form a resulting overall force, which draws the liquid resins through the slot.

The additional force—here referred to as electrostatic capillary force—brought about by creating a capacitor potential accelerates the flow velocity of the liquid reactive resin, which makes it possible to reduce the cycle time during the impregnating operation, for example during the trickling operation. In this way, a more cost-efficient impregnation that is of higher quality and is even more reproducible, along with a manufacturing structure that otherwise remains the same, is possible. Up to now, no technique that could influence the flow velocity of the reactive resin in a way that does not burden the rest of the system was available.

The teachings herein open up first of all the possibility of increasing the flow velocity of a reactive resin during the impregnation, without adversely affecting the viscosity or the toxicity through chemical additives and/or the crosslinking through increasing the temperature and/or the volatility of the overall system through increasing the pressure. Rather, it is precisely the properties of the system, the electrical conductivity of the surrounding housing, and the dielectricity of the reactive resin that are used here within the scope of the impregnating method, without having to accept manufacturing-related disadvantages in the process.

What is claimed is:

1. A device for impregnating, consolidating, or electrically insulating a body bearing single-layer or multi-layer windings, the device comprising:
    electrical contacts for applying a DC voltage between the windings and the body;
    a multi-component reactive resin; and
    a resin bath filled with the reactive resin;
    wherein the DC voltage of at least 1000 V/mm is applied across a 1 mm gap between the windings and the body, with the result that the body bearing the windings, on the one hand, and the windings, on the other hand, act like the two electrodes of a capacitor and draw in the reactive resin.

2. The device as claimed in claim 1, wherein at least one of the electrical contacts comprises a clamp.

3. The device as claimed in claim 1, wherein at least one of the electrical contacts comprises a sliding contact.

4. The device as claimed in claim 3, wherein the sliding contact comprises a carbon brush.

5. The device as claimed in claim 1, wherein the body comprises a motor.

6. The device as claimed in claim 1, wherein the body comprises a generator.

7. The device as claimed in claim 1, wherein the body comprises a transformer.

8. A method for impregnating an electric machine body bearing single-layer or multi-layer windings, the method comprising:
    dipping the body bearing windings into a resin bath holding a multi-component reactive resin; or
    trickling the multi-component reactive resin trickled over the body; or
    spraying the body with the multi-component reactive resin; and
    applying, during the impregnating operation, a DC voltage of at least 1000 V/mm is applied across a 1 mm gap between the windings and the body, with the result that the body bearing the windings, on the one hand, and the windings, on the other hand, act like the two electrodes of a capacitor and draw in the reactive resin.

9. The method as claimed in claim 8, wherein the DC voltage is at least 2000 V/mm.

10. The method as claimed in claim 8, wherein the DC voltage is in the range of 2100 V/mm to 4000 V/mm.

* * * * *